United States Patent [19]
Nishiwaki et al.

[11] Patent Number: 5,671,023
[45] Date of Patent: Sep. 23, 1997

[54] GAMMA CORRECTION CIRCUIT

[75] Inventors: Kazuhiko Nishiwaki, Kanagawa; Ken Nakajima, Tokyo, both of Japan

[73] Assignee: Sony Corporation, Tokyo, Japan

[21] Appl. No.: 553,871

[22] Filed: Nov. 6, 1995

[30]   Foreign Application Priority Data

Nov. 10, 1994  [JP]  Japan .................... 6-276780

[51] Int. Cl.$^6$ .................................... H04N 5/202
[52] U.S. Cl. ...................... 348/675; 348/674; 348/254
[58] Field of Search ....................... 348/254, 674, 348/675, 234, 609, 712; H04N 5/202

[56]      References Cited

U.S. PATENT DOCUMENTS

| | | | |
|---|---|---|---|
| 2,898,397 | 8/1959 | Richman | 348/675 |
| 4,415,923 | 11/1983 | Noda | 358/41 |
| 5,184,212 | 2/1993 | Yamamoto et al. | 358/39 |
| 5,296,920 | 3/1994 | Sakaue et al. | 348/675 |

*Primary Examiner*—John K. Peng
*Assistant Examiner*—Peter Kovacs
*Attorney, Agent, or Firm*—Jay H. Maioli

[57]      ABSTRACT

A gamma correction circuit capable of faithfully monitoring and outputting the color and luminance of an object without deteriorating the resolution. The gamma circuit includes an output-picture luminance signal generator for converting supplied color picture signals into luminance signals and for gamma-correcting the luminance signals for generating output-picture luminance signals, a low-pass filter for transmitting low-frequency components of the supplied picture signals, a luminance correction signal generator for generating a luminance correction signal by subtraction between a signal obtained on gamma-correcting picture signals supplied from the low-pass filter and converting the gamma-corrected picture signals into luminance signals and a signal obtained on converting the picture signals into luminance signals and gamma-correcting the luminance signals, an output-picture luminance signal correction unit for correcting the output-picture luminance signal based upon the output-picture luminance signal and the luminance correction signal, and a color difference matrix circuit for effecting chroma-conversion of the gamma-corrected picture signals supplied from the low-pass filter.

3 Claims, 3 Drawing Sheets

GAMMA CORRECTION CIRCUIT

BACKGROUND OF THE INVENTION

This invention relates to a gamma correction circuit. More particularly, it relates to a gamma correction circuit for carrying out gamma correction on color picture signals for regenerating the color and luminance of an object for outputting a picture.

Nowadays, a video camera device or an image scanner, imaging an object using an imaging device such as a CCD image sensor or a camera tube, has come into in widespread use.

The video camera device or the image scanner has an imaging device for generating picture signals by imaging an object and a gamma correction circuit supplied with picture signals, and outputs picture signals from the gamma correction circuit to a monitor.

The gamma correction circuit carries out gamma correction on the picture signals for compensating color and luminance characteristics for faithfully regenerating the color and the luminance of the object on a monitor.

There is known a gamma correction system consisting in multiplying three prime color signals, that is a red signal (R signal), a green signal (G signal) and a blue signal (B signal) by 0.45 in accordance with the following equation (1):

$$R'=R^{0.45}$$
$$G'=G^{0.45}$$
$$B'=B^{0.45} \quad (1)$$

for generating luminance signal Y' in accordance with the following equation (2):

$$Y'=0.3R'+0.59G'+0.11B' \quad (2)$$

Although this system faithfully reproduces the color of the object on a monitor, there is a problem that a high range correction circuit for generating the luminance signal Y' becomes complex.

There is also known a system consisting in converting the luminance signal Y shown in the following equation (3):

$$Y=0.3R+0.59G+0.11B \quad (3)$$

into a luminance signal Y" in accordance with the following equation (4):

$$Y''=(0.3R+0.59G+0.11B)^{0.45}=Y^{0.45} \quad (4)$$

by way of performing gamma correction. With this system, not only is the circuit arrangement simple, but also can the luminance signal be prohibited from being lowered in resolution since the high-range correction and the gamma correction are carried out in this order on the luminance signals Y. This system, however, raises a problem that color reproduction cannot be achieved faithfully.

SUMMARY OF THE INVENTION

It is therefore an object of the present invention to provide a gamma correction circuit whereby it is possible not only to prevent deterioration in resolution easily but also to reproduce and output the color and luminance of the object faithfully.

According to the present invention, there is provided a gamma correction circuit including output picture luminance signal generating means having first conversion means for converting supplied color picture signals into luminance signals and first gamma correction means for gamma correcting an output signal of the first conversion means, a low-pass filter for transmitting low-frequency band components of the supplied picture signals, second gamma correction means for gamma correcting the picture signals supplied from the low-pass filter second conversion means for converting the gamma-corrected picture signals into luminance signals, third conversion means for converting the picture signals supplied from the low-pass filter into luminance signals, third gamma correction means for gamma correcting the luminance signals, a luminance correction signal generator for generating a luminance correction signal from an output signal of the second conversion means and an output signal of the third gamma correction means, output picture luminance signal correction means for correcting an output of the luminance signal generator based upon the luminance correction signal, and color difference matrix means for generating color difference signals from an output of the second gamma correction means.

With the above-described gamma correction circuit of the present invention, the output luminance signal generator generates an output picture luminance signal superior in both resolution and luminance reproducibility, and the color difference signal having superior color reproducibility is generated in the color difference matrix circuit based upon picture signals of a low frequency range supplied from the low-pass filter. The luminance correction signal generator generates the luminance correction signal which is the difference between the luminance signal of the color difference signal generated by the color difference matrix circuit and the luminance signal generated by the output luminance signal generator. The luminance signal correction unit corrects the output luminance signal using the luminance correction signal for correcting the low-frequency range of the luminance signal so as to be coincident with the luminance signal of the color difference signal. Thus the color difference signal capable of outputting the color with good reproducibility in the low-frequency range and the output luminance signal corrected so as to be coincident with luminance signals of the color difference signals in the low frequency range are produced such that the color and the luminance of the object may be faithfully reproduced and outputted on the monitor without broadening the frequency range or deteriorating the resolution.

DETAILED DESCRIPTION OF THE PREFERRED EMBODIMENTS

Figure 1:
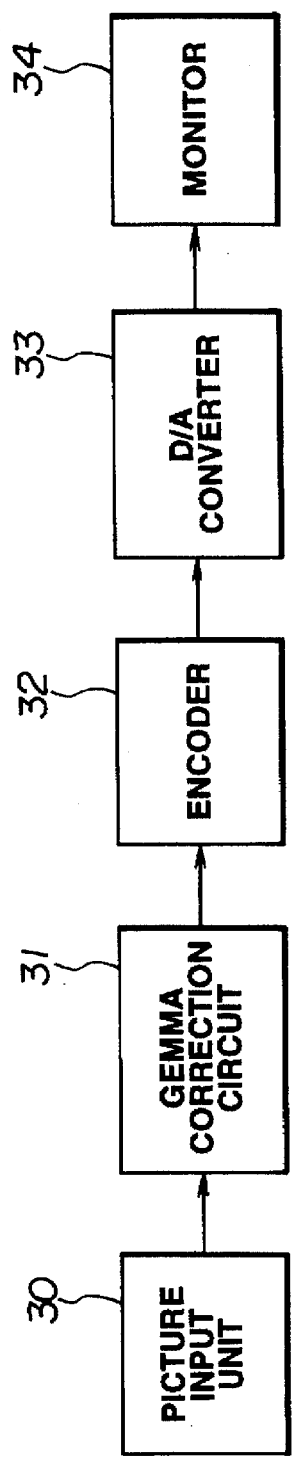
FIG. 1 is a block diagram showing a video camera device provided with a gamma correction circuit according to the present invention.

Referring to the drawings, preferred embodiments of the gamma correction circuit according to the present invention will be explained in detail.

The gamma correction circuit according to the present invention is provided for correcting picture signals of a video camera device, as shown for example in FIG. 1.

The video camera device, having the gamma correction circuit as shown in FIG. 1, has a picture input unit 30, supplied with picture signals, a gamma correction circuit 31 for performing gamma correction on picture signals supplied from the picture input unit 30, an encoder 32 for converting the gamma-corrected picture signals into NTSC signals and PAL signals, a D-A converter 33 for D/A converting the encoded picture signals supplied from the encoder 32 and a monitor 34 for outputting the picture signals from the D/A converter.

Figure 2:
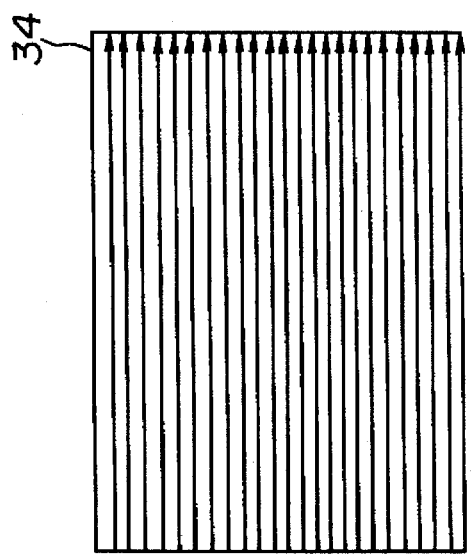
FIG. 2 is a schematic view showing picture signals supplied to the gamma correction circuit shown in FIG. 1.

The picture signals supplied to the gamma correction circuit 31 are picture signals of three respective colors R, G and B generated on imaging an object by an imager, such as a CCD image sensor, not shown, so as to be then A/D converted and subsequently displayed on a monitor 34 shown in FIG. 2.

Figure 3:
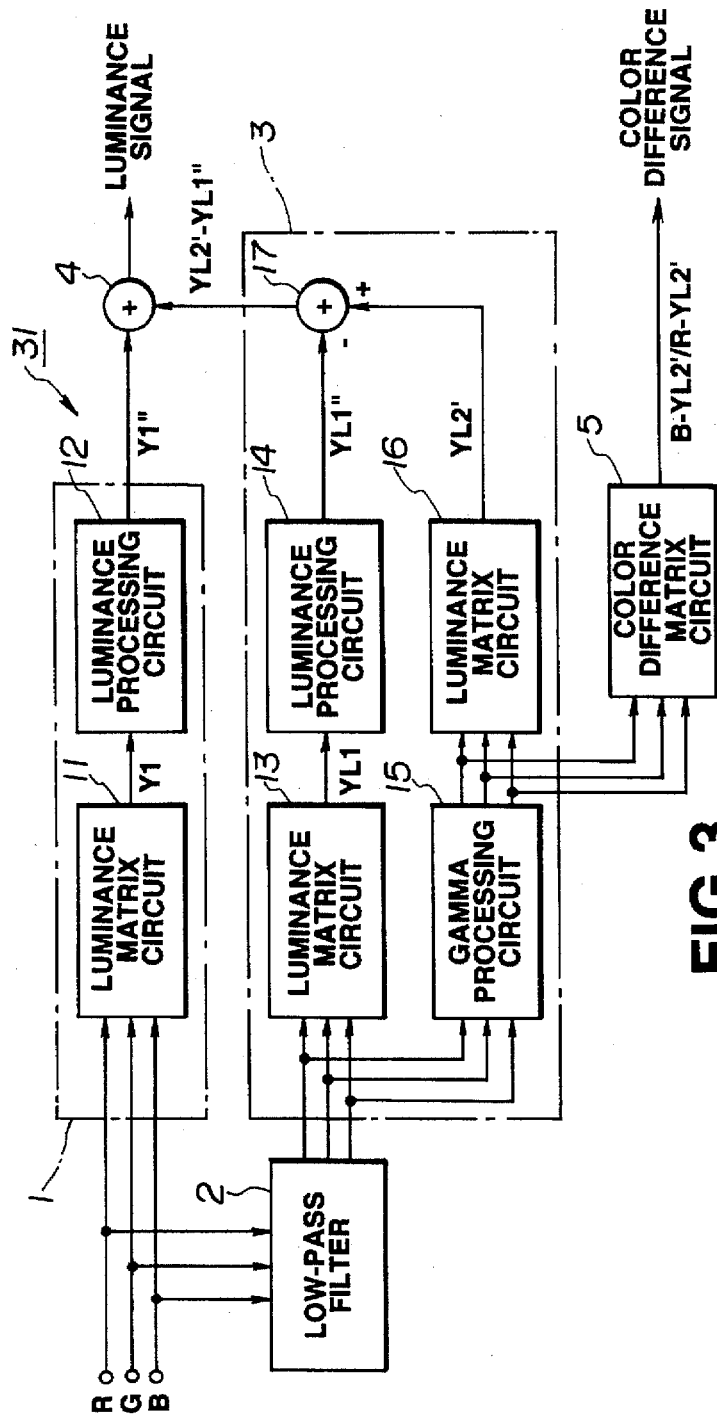
FIG. 3 is a block diagram of the gamma correction circuit shown in FIG. 1.

Referring to FIG. 3, the gamma correction circuit 31 includes an output-picture luminance signal generator 1 for generating a luminance signal of the output picture based upon the picture signals supplied from the picture signal input unit 30, and a low-pass filter 2 for passing low-frequency components of the picture signals. The gamma correction circuit also includes a luminance correction signal generator 3 for generating luminance correction signals based upon the picture signals supplied from the low-pass filter 2 and an output-picture luminance correction unit 4 for correcting the luminance signals of the output picture based upon the luminance correction signals. The gamma correction circuit also includes a color difference matrix circuit 5 supplied with the gamma-corrected picture signals from a gamma processing circuit 15 of the luminance correction signal generator 3 based upon picture signals supplied from the low-pass filter 2 for generating color difference signals.

The output-picture luminance signal generator 1 has a luminance matrix circuit 11 for converting the picture signals supplied from the picture signal input unit 30 into luminance signals, and a gamma processing circuit 12 for gamma-correcting the luminance signals supplied from the luminance matrix circuit 11.

The luminance matrix circuit 11 generates a luminance signal Y1 from the picture signals of the respective colors represented by the three color signals (R, G and B signals) in accordance with the following equation (5):

$$Y1 = 0.3R + 0.59G + 0.11B \tag{5}$$

The gamma processing circuit 12 is constituted by a memory having stored therein a conversion table configured for outputting an output signal $OUT = IN^{0.45}$ in accordance with the following equation (6) for the input signal IN:

$$Y1 = (0.3R + 0.59G + 0.11B)^{0.45} \tag{6}$$

The output picture luminance signal generator 1 generates the output-picture luminance signal Y1" which is a high-resolution signal in that it exhibits a wide-range of frequency characteristics from a low frequency range to a high frequency range.

The low-pass filter 2 exhibits low-pass characteristics with respect to frequency characteristics in the vertical direction. Thus the low-pass filter 2 performs an operation of convolution with a picture signal of a scanning line within ±k'th scanning line, centered about the n'th scanning line from the vertical synchronization signal, as an input signal IN(n), in accordance with the following equation (7):

$$OUT(n) = \sum_{n-k}^{n+k} F(k) \cdot IN(n) \tag{7}$$

for outputting an output signal OUT(n) as a picture signal forming the nth scanning line.

The coefficient F(k), a function of k, is pre-formulated in a table and stored in a memory, or found by calculations.

The low-pass filter 2 averages picture signals of the scanning lines within n±k'th scanning lines for suppressing the effects of the high-frequency range components.

Figure 4:
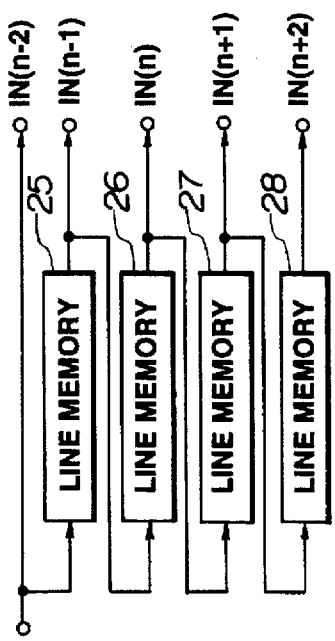
FIG. 4 is a block diagram showing essential portions of a low-pass filter of the gamma correction circuit shown in FIG. 1.

FIG. 4 shows an example of the low-pass filter 2 which does not resort to the calculations of the equation (7). The low-pass filter 2 includes a line memory 25 for storing picture signals of one scanning line supplied from the picture input unit 30, a line memory 26 for storage of picture signals supplied from the line memory 25, a line memory 27 for storage of picture signals supplied from the line memory 26 and a line memory 28 for storage of picture signals supplied from the line memory 27.

The following explanation is made for a case in which picture signals IN(n−2) of the scanning line two lines after the n'th scanning line from the vertical synchronizing signal are supplied from the picture input unit 30. The picture signal IN(n−1) of the picture signal of a scanning line one line after the nth scanning line, the picture signal IN(n) of the picture signal of the nth scanning line, the picture signal IN(n+1) of the picture signal of a scanning line one line before the nth scanning line and the picture signal IN(n+2) of the picture signal of a scanning line two lines before the nth scanning line, are stored in the line memories 25, 26, 27 and 28, respectively. The picture signals, each for one line, are multiplied by a coefficient F(k) to give the coefficients F(k)×(the respective picture signals) which are summed together to give an output signal. Thus the picture signals of the scanning lines within n±k'th lines are averaged to suppress the effects of high-range components.

The luminance correction signal generator 3 has a luminance matrix circuit 13 for converting the picture signals supplied from the low-pass filter 2 into luminance signals, and a gamma processing circuit 14 for gamma-correcting the luminance signals supplied from the luminance matrix circuit 13. The luminance correction signal generator also includes a gamma processing circuit 15 for gamma-correcting the picture signals supplied from the low-pass filter 2 and a luminance matrix circuit 16 for converting the gamma-processed picture signals into luminance signals. The luminance correction signal generator 3 also has a subtraction circuit 17 for subtracting an output of the gamma processing circuit 14 from an output of the luminance matrix circuit 16.

The luminance matrix circuit 13 generates luminance signals YL1 from the picture signals of the low-range frequency components of the respective colors from the low-pass filter 2 represented by three colors R, G and B in accordance with the above equation (5).

The gamma processing circuit 14 is comprised of a memory having stored therein a table configured for outputting an output signal $OUT = IN^{0.45}$ in accordance with the above equation (6). The resulting signal is outputted as a luminance signal YL1".

The gamma processing circuit 15 is comprised of a memory having stored therein a table configured for outputting an output signal $OUT = IN^{0.45}$ by processing the input signal IN in accordance with the following equations (8):

$$R' = R^{0.45}$$
$$G' = G^{0.45}$$
$$B' = B^{0.45} \tag{8}$$

thus the gamma processing circuit multiplies the low-range frequency component picture signals of the respective colors represented by R, G and B signals supplied from the low-pass filter 2 by 0.45 and outputs the resulting product signals.

The luminance matrix circuit 18 generates a luminance signal YL2' from the picture signals of the respective colors supplied from the gamma processing circuit 15 in accordance with the following equation (9):

$$YL2' = 0.3R' + 0.59G' + 0.11B' \tag{9}$$

For correcting color signals in the low range having significant effects on the visual sense as the color information on a monitor, the luminance correction signal generator 3, described above, transmits the same signal as the luminance signal YL2' of the color difference signal transmitted by the color difference matrix circuit 5 as later explained, from the luminance matrix circuit 16, and transmits a luminance correction signal YL2'−YL1", obtained on subtracting the luminance signal YL1" from the luminance signal YL2' by the subtraction circuit 17, and transmits the luminance correction signal YL2'−YL1" to the output-picture luminance signal correction unit 4.

The output-picture luminance signal correction unit 4 sums the output-picture luminance signal Y1" to the luminance correction signal YL2'−YL1" to produce a corrected output-picture luminance signal Y2", corrected so as to be coincident with the luminance signal YL2' in the low-frequency range.

The color difference matrix circuit 5 performs calculations in accordance with the equations (10) and (11):

$$B - YL2' = -0.3R - 0.59G + 0.89B \tag{10}$$

$$R - YL2' = 0.7R - 0.59G - 0.11B \tag{11}$$

on the low-range picture signals of the respective colors represented by three colors R, G and B supplied from the low-pass filter 2 to produce color difference signals B−YL2' and R−YL2'.

For the color difference signals B−YL2' and R−YL2', the same signals as the luminance signal YL2' sent from the luminance matrix circuit 16 are employed. The color signals B−YL2' and R−YL2' are low-range signals having a significant effect on the visual sense as the color information on a monitor such that the sufficient color information in a narrow range is issued from the color difference matrix circuit 5.

With the above-described gamma correction circuit 31 having the above configuration, the color difference matrix circuit 5 produces the color difference signals B−YL2' and R−YL2' exhibiting high color reproducibility, while the output-picture luminance signal correction unit 4 corrects the output-picture luminance signal Y1" to the corrected output-picture luminance signal Y2" so that the output-picture luminance signal Y1" will be coincident in the low-frequency range with the luminance signal YL2' of the color difference signal in the low frequency range.

Thus, by these color difference signals B−YL2' and R−YL2' and the corrected output-picture luminance signal Y2", the color and the luminance of the object may be faithfully reproduced on the monitor and outputted without broadening the frequency range or deteriorating the resolution.

The second embodiment of the present invention will be explained by referring to FIG. 5. The parts or components which are the same as those used in the above example are depicted by the same numerals and the corresponding description is not made for clarity.

Figure 5:
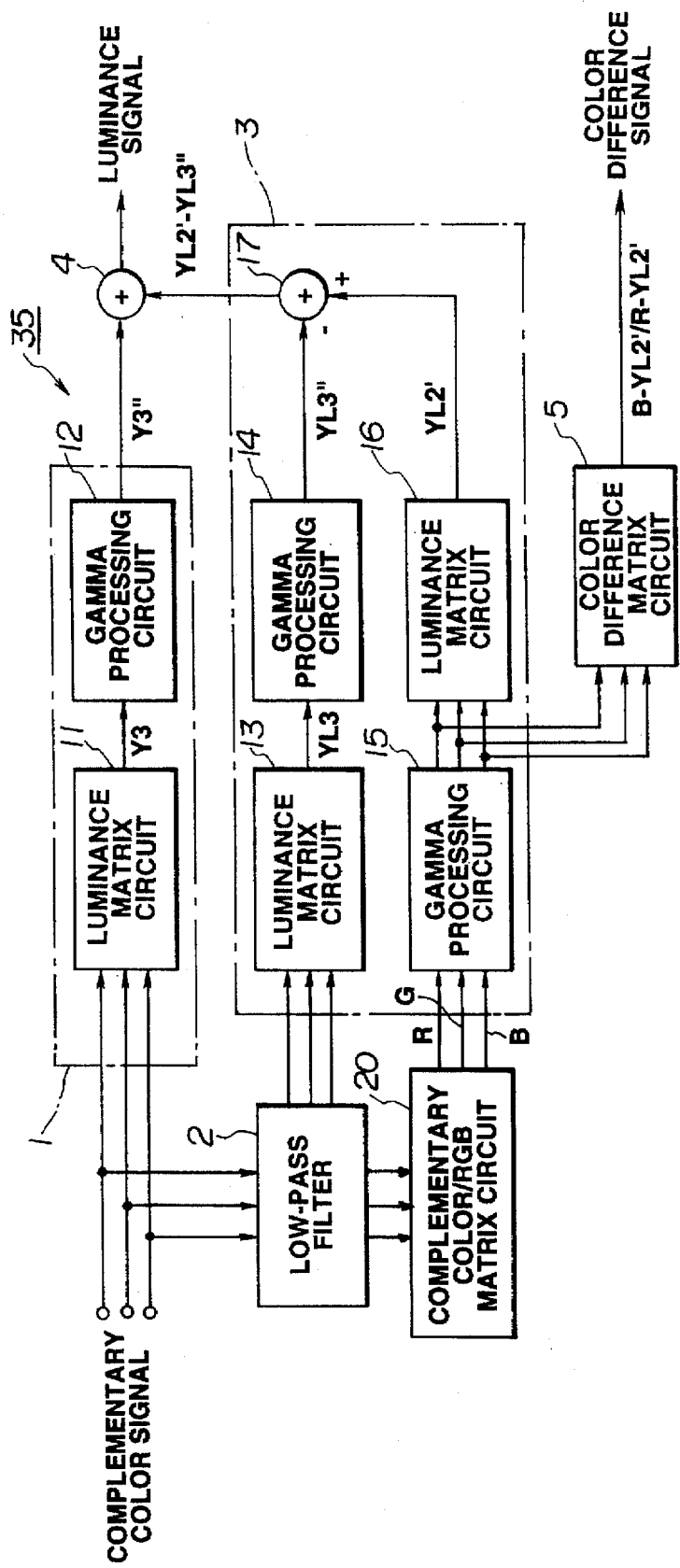
FIG. 5 is a block diagram showing a gamma correction circuit according to a second embodiment of the present invention.

Referring to FIG. 5, a gamma correction circuit 35 includes an output luminance signal generator supplied from the picture signal input unit 30 with complementary color signals of the three colors R, G and B signals, namely a cyan (Cy) signal, a magenta (Mg) signal and a yellow (Ye) signal, and a low-pass filter 2 for transmitting low-frequency components of the picture signals. The gamma correction circuit also has a complementary color/RGB matrix circuit 20 supplied from the low-pass filter 2 with complementary color signal of the picture signals and a luminance correction signal generator 3 supplied with the R, G and B signals and the complementary color signals from the complementary color/RGB matrix circuit 20 and the low-pass filter 2, respectively, for generating luminance correction signals. The gamma correction circuit also includes an output-picture luminance signal correction unit 4 for correcting the output-picture luminance signal by the luminance correction signal and a color difference matrix circuit 5 supplied with picture signals gamma-corrected by the gamma processing circuit 15 of the luminance correction signal generator 3 for generating the color difference signal.

The luminance matrix circuit 11 of the output luminance signal generator 1 and the luminance matrix circuit 13 of the luminance correction signal generator 3 are configured for effecting conversion using an equation in which the complementary colors Cy, Mg and Ye signals are substituted for the three color signals (R, G and B signals) of the equation (5) and coefficients for Cy, Mg and Ye signals are substituted for the respective coefficients 0.3, 0.59 and 0.11 of the equation (5).

The luminance matrix circuit 11 of the output picture luminance signal generator 1 converts the complementary color signals into a luminance signal Y3 in accordance with the equation (5).

The gamma processing circuit 12 of the output-picture luminance signal generator 1 converts the luminance signal Y3 into an output picture luminance signal Y3" in accordance with the above equation (6).

The output-picture luminance signal generator 1 generates, from the complementary color signals of the picture signals supplied thereto, the output-picture luminance signal Y3" which is a high-resolution signal in that it exhibits wide-range frequency characteristics for a low frequency range up to a high frequency range.

The complementary color/RGB matrix circuit 20 is fed with the Cy signal, which is a complementary color of the R signal obtained on addition of the G and B signals in a pre-set ratio, the Mg signal, which is a complementary color of the G signal obtained on addition of the R and B signals in a pre-set ratio and the Ye signal, which is a complementary color of the B signal obtained on addition of the R and G signals in a pre-set ratio. Based upon the respective addition ratios, the complementary color/RGB matrix circuit 20 converts the signals supplied thereto into three color signals of R, G and B signals.

The luminance correction signal generator 3 includes a luminance matrix circuit 13 for converting the complimentary signals of the picture signals supplied from the low-pass filter 2 into luminance signals, and a gamma processing circuit 14 for gamma-correcting the luminance signals supplied from the luminance matrix circuit 13. The luminance correction signal generator 3 also has a gamma processing circuit 15 for gamma-correcting the picture signals supplied from the complementary color/RGB matrix circuit 20 and a luminance matrix circuit 16 for converting the gamma-processed picture signals into luminance signals. The luminance correction signal generator 3 also has a subtraction circuit 17 for subtracting an output of the gamma processing circuit 14 form an output of the luminance matrix circuit 16.

The luminance matrix circuit 13 converts the complementary color signal supplied from the low-pass filter 2 into a luminance signal YL3 in accordance with the above equation (5).

The gamma processing circuit 14 converts the luminance signal YL3 into an output picture luminance signal YL3" in accordance with the above equation (6).

The gamma processing circuit 15 gamma-corrects the R, G and B signals of the picture signals supplied from the complementary color/RGB matrix circuit 20 in accordance with the above equation (8).

The luminance matrix circuit 16 converts the gamma-processed picture signals (R, G and B signals) into a luminance signal YL2' in accordance with the above equation (9).

The subtraction circuit 17 subtracts, from the luminance signal YL2' transmitted from the luminance matrix circuit 16, the luminance signal YL3" transmitted from the gamma processing circuit 14, to produce a luminance correction signal YL2'−YL3", which is outputted to the output-picture luminance signal correction unit 4.

For correcting the color signals in the low frequency range exhibiting significant effects on the visual sense as the color information displayed on the monitor, the signals which are the same as the luminance signal YL2' of the color difference signal transmitted by the color difference matrix circuit 5 are transmitted from the gamma processing circuit 16, while the signals which are the same as the luminance signal YL3" transmitted by the output picture luminance signal generator 1 are transmitted by the gamma processing circuit 14. The luminance correction signal YL2'−YL3", obtained on subtracting the luminance signal YL3" from the luminance signal YL2' by the subtraction circuit 17, is transmitted to the output-picture luminance signal correction unit 4.

The output-picture luminance signal correction unit 4 sums the output-picture luminance signal Y3" to the luminance correction signal YL2'−YL3" to produce the corrected output-picture luminance signal Y2", corrected so as to be coincident with the luminance signal YL2' in the low frequency range.

With the above-described gamma correction circuit, the color difference signal with good color reproducibility B−YL2' and R−YL2' are produced in the color difference matrix circuit 5 so that the output luminance signal Y3" is corrected by the output picture luminance signal correction circuit 4 to the corrected output-picture correction luminance signal Y2" so as to be coincident with the luminance signal YL2' of the color difference signal in the low frequency range.

Thus, by these color difference signals B−YL2' and R−YL2' and the corrected output-picture luminance signal Y2", the color and the luminance of the object may be faithfully reproduced on the monitor ad outputted without broadening the frequency range or deteriorating the resolution.

What is claimed is:

1. A gamma correction circuit, comprising:

output-picture luminance signal generating means including first conversion means for converting supplied color picture signals into first luminance signals, and first gamma correction means for gamma correcting said first luminance signals from said first conversion means and outputting an output-picture luminance signal;

a low-pass filter for transmitting low-frequency band components of said supplied color picture signals;

luminance correction signal generating means including
   second gamma correction means for gamma correcting said low-frequency band components of said supplied color picture signals transmitted by said low-pass filter, second conversion means for converting gamma-corrected color picture signals from said second gamma correction means into second luminance signals, third conversion means for converting said low-frequency band components of said supplied color picture signals transmitted by said low-pass filter into third luminance signals, third gamma correction means for gamma correcting said third luminance signals, and a luminance correction signal generator for generating a luminance correction signal from said second luminance signals from said second conversion means and an output signal of said third gamma correction means;

output-picture luminance signal correction means for correcting said output-picture luminance signal from said output-picture luminance signal generating means in response to said luminance correction signal from said luminance correction signal generator and outputting a corrected luminance signal; and color difference matrix means for generating color difference signals from said gamma corrected color picture signals from said second gamma correction means.

2. The gamma correction circuit as claimed in claim 1, wherein said supplied color picture signals comprise R, G, and B color signals.

3. A gamma correction circuit, comprising:

output-picture luminance signal generating means having first conversion means for converting supplied color picture signals into first luminance signals and first gamma correction means for gamma correcting said first luminance signals from said first conversion means;

a low-pass filter for transmitting low-frequency band components of said supplied color picture signals;

second gamma correction means for gamma correcting said low-frequency band components of said supplied color picture signals transmitted by said low-pass filter;

second conversion means for converting gamma-corrected color picture signals from said second gamma correction means into second luminance signals;

third conversion means for converting said low-frequency band components of said supplied color picture signals transmitted by said low-pass filter into third luminance signals;

third gamma correction means for gamma correcting said third luminance signals;

a luminance correction signal generator for generating a luminance correction signal from an output signal of said second conversion means and an output signal of said third gamma correction means;

output-picture luminance signal correction means for correcting an output of said output-picture luminance signal generating means in response to said luminance correction signal; and color difference matrix means for generating color difference signals from an output of said second gamma correction means, wherein said low-pass filter has low-pass characteristics corresponding to frequency characteristics in a vertical direction of a video display.

* * * * *